2,872,930

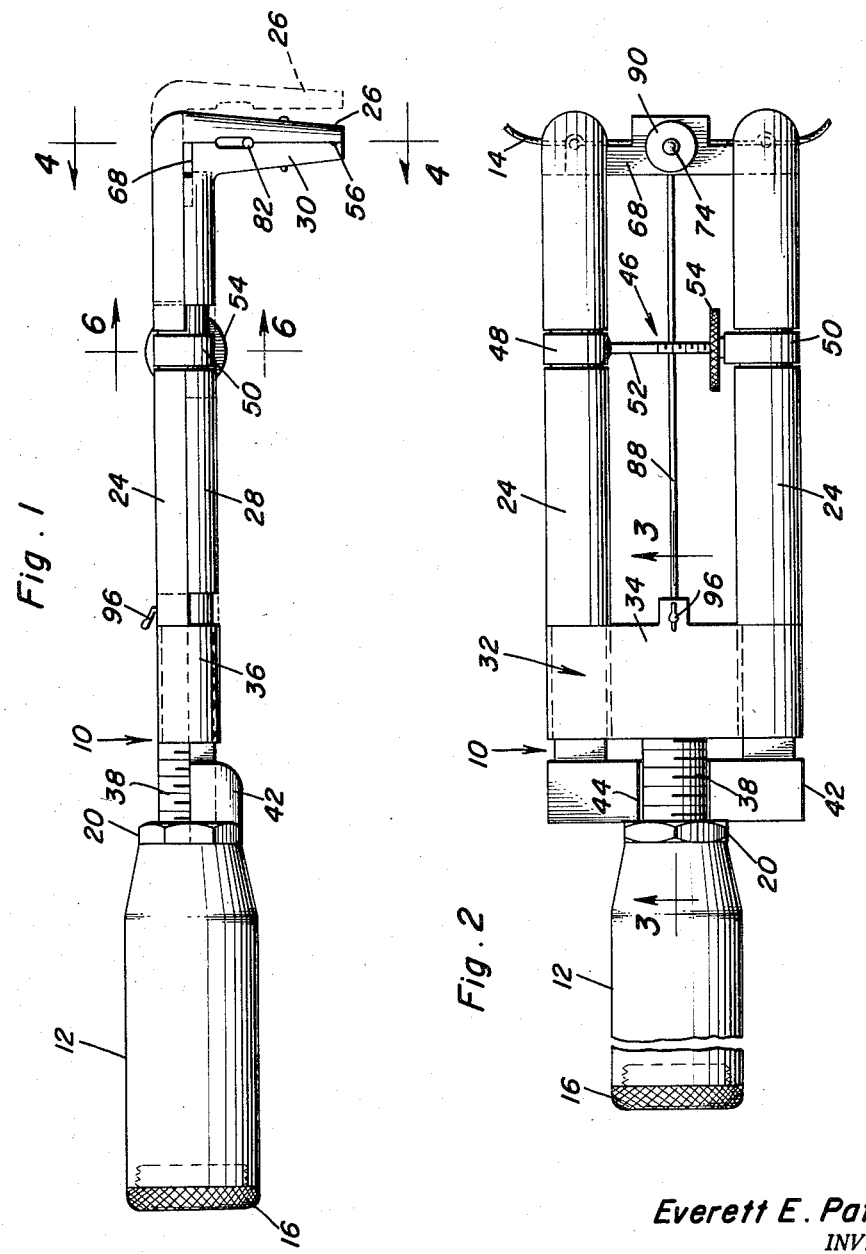

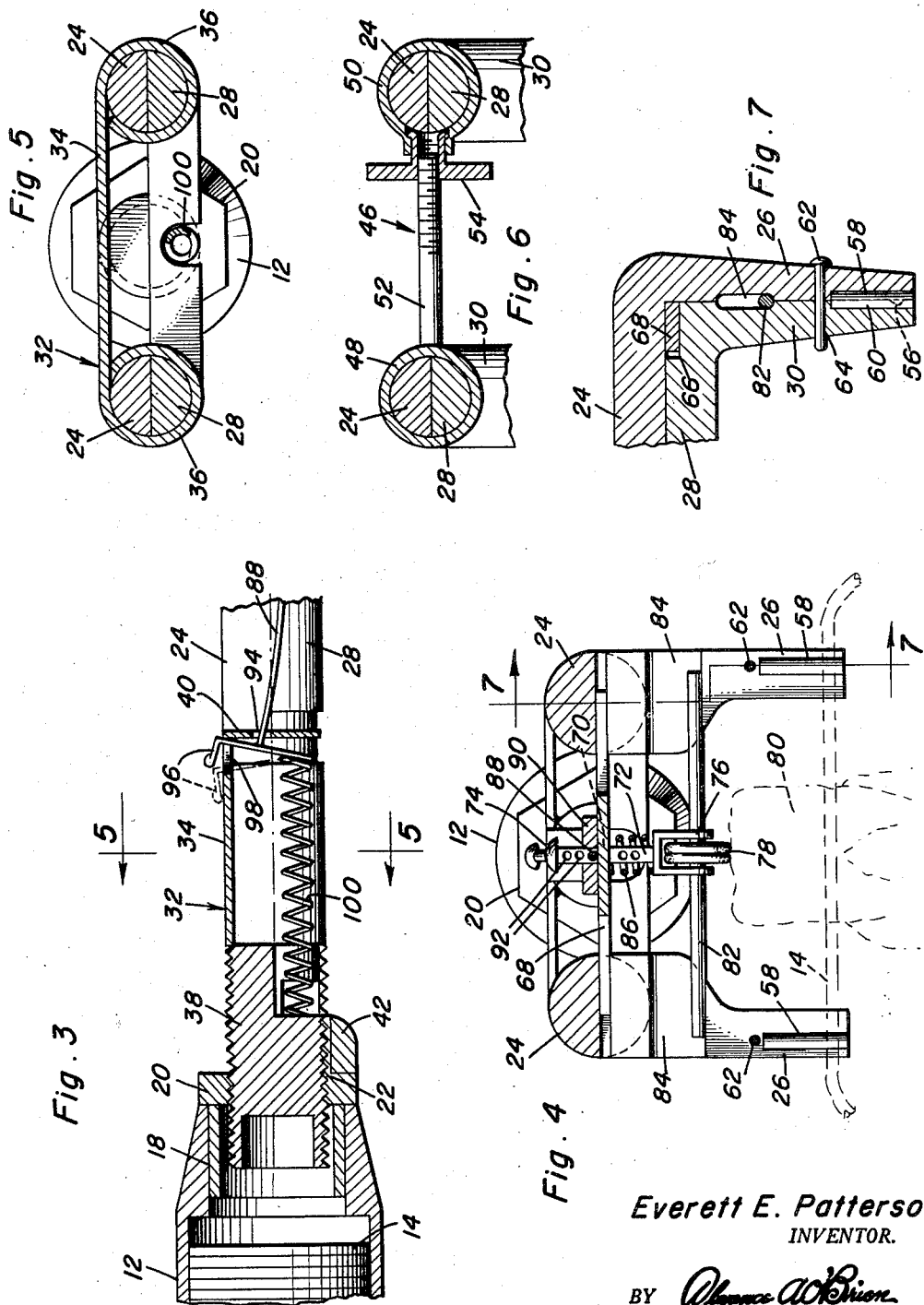

DENTAL FLOSS HOLDER

Everett E. Patterson, Jackson, Miss.

Application November 20, 1956, Serial No. 623,478

8 Claims. (Cl. 132—192)

This invention relates in general to new and useful improvements in support devices, and more particularly to an improved dental floss holder.

The primary object of this invention is to provide an improved dental floss holder which includes a pair of transversely spaced jaws for holding the length of dental floss, there being disposed intermediate the jaws and above the general level of the dental floss a tooth engageable wheel whereby the downward movement of the dental floss between teeth is limited thus preventing the dental floss from injuring the gums during a tooth cleaning operation.

Another object of this invention is to provide an improved dental floss holder which includes a tooth engageable wheel for limiting the movement of dental floss down between teeth being cleaned, the wheel being adjustably mounted whereby the dental floss holder is adaptable for use with teeth of all heights.

Another object of this invention is to provide an improved dental floss holder which includes transversely spaced pairs of jaws carried by longitudinally extending arms, the arms being so connected together and to a handle whereby the handle may be rotated to positively shift to arms to effect relative movement between the jaws to effect a dental floss clamping operation or a dental floss releasing operation.

A further object of this invention is to provide an improved dental floss holder which includes a handle and pairs of longitudinally extending arms which terminate in depending jaws, the arms being shiftable by the handle to effect relative movement between the jaws, there extending between the arms a tensioning device whereby the jaws may be spread apart to tension a length of dental floss after it has been positioned in the jaws.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a dental floss holder and shows it in an operative position, the jaws of the dental floss holder being shown in a dental floss releasing position by dotted lines;

Figure 2 is a plan view of the dental floss holder of Figure 1 and shows in more detail the construction thereof, an intermediate portion of the handle being broken away;

Figure 3 is an enlarged fragmentary longitudinal sectional view taken substantially upon the plane indicated by the section line 3—3 of Figure 2 and shows the specific connection between the handle and the arms of the dental floss holder for effecting relative movement between the arms;

Figure 4 is an enlarged fragmentary transverse sectional view taken substantially upon the plane indicated by the section line 4—4 of Figure 1 and shows the specific details of the mounting of a tooth engageable wheel limiting the downward movement of a length of dental floss relative to a tooth, there being shown in dotted lines the dental floss and a tooth being cleaned by the dental floss;

Figure 5 is an enlarged transverse sectional view taken substantially upon the plane indicated by the section line 5—5 of Figure 3 and shows the details of a transverse connector connecting together the arms;

Figure 6 is an enlarged transverse fragmentary sectional view taken substantially upon the plane indicated by the section line 6—6 of Figure 1 and shows the specific details of a combined transverse connector and tensioning device; and Figure 7 is an enlarged fragmentary sectional view taken substantially upon the plane indicated by the section line 7—7 of Figure 4 and shows the specific details of one pair of jaws.

Referring now to the drawings in detail, it will be seen that there is illustrated the dental floss holder which is the subject of this invention, the dental floss holder being referred to in general by the reference numeral 10. The dental floss holder 10 includes an elongated handle 12. The handle 12 is hollow, as is best illustrated in Figure 3, and forms a receptacle for dental floss 14. In order that the dental floss 14 may be dispensed, the rear end of the handle 12 is closed by a closure cap 16. The forward end of the handle 12 is provided with a bore 18 which opens through the forward end thereof and which has positioned therein a fitting 20. The fitting 20 is provided with an internally threaded bore 22.

The dental floss holder 10 also includes a first pair of arms 24. The arms 24 are transversely spaced and extend longitudinally of the dental floss holder 10. The arms 24 terminate at their forward ends in first dental floss clamping jaws 26. Underlying the arms 24 are second arms 28. The second arms 28 terminate in depending second jaws 30 at their forward ends, the jaws 26 and 30 cooperating to clamp dental floss therebetween.

As is best illustrated in Figure 5, the arms 24 and 28 are of semi-circular cross-section with the flat portions thereof in abutment. Thus there is a sliding engagement between the arms 24 and the arms 28.

The rear ends of the arms 24 are connected together by a transverse connector which is best illustrated in Figures 3 and 5. The transverse connector is referred to by the reference numeral 32 and includes a transverse strap portion 34 which terminates in a pair of sleeves 36 at opposite ends of the strap portion 34. The sleeves 36 pass around both the arms 24 and the arms 28 and serve both as a connector for the two pairs of arms 24 and 28 and as a guide for relative movement between the arms 24 and the arms 28.

The transverse connector 32 also includes an externally threaded extension 38 which is secured to the rear part of the strap portion 34 and which is threadedly engaged in the internally threaded bore 22 of the fitting 20. The transverse connector 32 also includes a depending forward flange 40 connected to the forward edge of the strap portion 34.

The rear ends of the arms 28 are connected together by a transverse block 42. The transverse block 42 is provided with a central recess 44, as is best illustrated in Figure 2, for the passage of the extension 38. The transverse block 42 abuts against the forward face of the fitting 20 and thus limits relative movement between the arms 24 and 28.

Inasmuch as the threaded extension 38 of the transverse connector 32 is threadedly engaged in the fitting 20 and since the fitting 20 bears against the transverse block 42, it will be seen that when the handle 12 is rotated to thread the extension 38 into the fitting 20, the arms 24 will be moved towards the handle relative to the arms 28 so that the jaws 26 will move rearwardly into clamping engagement with the jaws 30. When the handle 12 is rotated in the opposite direction, the jaws 26 are moved forwardly to released position such as that shown by dotted lines in Figure 1.

Extending between intermediate portions of the arms 24 and 28 is a combined transverse connector and tensioning device which is referred to in general by the reference numeral 46. The device 46, as is best illustrated in Figure 6, includes a pair of sleeve portions 48 and 50 in which are received the arms 24 and 28. The sleeve portion 48 has rigidly connected thereto an externally threaded transverse member 52 which is received in an internally threaded hand wheel 54. The hand wheel 54 is journaled in the sleeve portion 50 for rotation, but is locked against transverse movement relative thereto. Thus, as the hand wheel 54 is rotated, the effective length of the device 46 is selectively increased or decreased. By utilizing the device 46, the pairs of jaws may be moved with respect to each other transversely of the dental floss holder 10.

It is to be noted that the forward face of the individual jaws 30 have formed in the lower part thereof a notch 56. The notch 56 is intended to receive a length of dental floss 14 which will extend between the pairs of jaws. Further, the jaws 26 and 30 are provided with vertically extending complementary recesses 58 and 60 to form a vertically extending bore for the reception of a pin or the like. Carried by the first jaws 26 are lining pins 62 which extend through horizontal bores 64 in the second jaws 30 to retain the jaws 26 and 30 in alignment at all times.

As is best illustrated in Figure 7, the upper part of each of the jaws 30 is notched as at 66 for the reception of a transverse support bar 68. The transverse support bar 68 is provided with a vertical bore 70 in the center thereof, which vertical bore has extending downwardly therethrough a vertical spindle 72. The upper end of the spindle 72 is provided with a head 74 to limit the downward movement thereof. The lower end of the spindle 72 is provided with a wheel mounting fitting 76 of the fork type in which there is mounted a suitable wheel 78. The wheel 78 is for the purpose of engaging the top of a tooth, such as the tooth 80 to limit downward movement of the dental floss 14 between the adjacent teeth 80 as the result of injury to the gum.

The wheel 78 is mounted with respect to the wheel support 76 by means of an elongated transverse axle 82. The axle 82 has the opposite ends thereof disposed in a vertical recess 84 formed between each pair of jaws 26 and 30, as is best illustrated in Figure 7. This permits vertical movement of the axle 82 and the wheel 78 and at the same time reinforces the support for the wheel 78 to prevent twisting thereof.

The wheel 78 is normally urged downwardly by a sprfng 86 disposed between the transverse support bar 68 and the wheel support 76. However, the wheel 78 is positioned against vertical movement by a rod 88 which has the forward end thereof passing through a member 90 mounted on the top surface of the support bar 68, which member 90 has passing therethrough the vertical spindle 72. The vertical spindle 72 is provided with a plurality of vertically spaced bores 92 through which the rod 88 passes.

The rod 88 is elongated and passes through an opening 94 formed in the flange 40 of the transverse connector 32. The rear end of the rod 88 is connected to an operating lever 96 which extends upwardly through a longitudinally elongated slot 98 formed in the strap portion 34, as is best illustrated in Figure 3.

Extending between the lower end of the lever 96 and the forward end of the threaded extension 38 is a coil spring 100. The coil spring 100 normally urges the rod 88 to a spindle locking position. The rod 88 may be retracted from the spindle 72 to facilitate vertical adjustment of the wheel 78 by pulling back on the lever 96 to its dotted line position of Figure 3.

In the operation of the dental floss holder 10, the handle 12 is first unscrewed with respect to the extension 38 so that the jaws 26 move forwardly with respect to the jaws 30. A tensioning device 46 is then adjusted so that the jaws 26 and 30 are spaced apart a minimum distance transversely of the dental floss holder. Then a length of dental floss 14 is pulled from the handle 12 and is positioned in the notches 56. The handle 12 is again tightened with the result that the jaw 26 clamps the opposite end portions of the length of dental floss 14 in the notches 56 and the jaws 30. Then the tensioning device 46 is adjusted to move the jaws 26 and 30 apart transversely to tension the dental floss 14. This having been accomplished, the wheel 78 is vertically adjusted with respect to the dental floss 14 to accommodate the particular person utilizing the dental floss holder 10. The dental floss holder 10 is now ready for use.

It is to be noted that while the dental floss holder 10 has been specifically illustrated and described for use as a holder of dental floss, it may be used for holding sand paper and other similar articles. Also, while the arms 24 and 26 have been recessed for receiving the sleeves 36 and the sleeve portions 48 and 50, this would not be necessary. However, such a construction presents both a neater appearance and eliminates objectionable projections on the arms 24 and 28. Further, the sleeves 36 and the sleeve portions 48 and 50 limit relative movement between the arms 24 and 28 to prevent separation thereof in the event the handle 12 is unscrewed too far with respect to the threaded extension 38.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A dental floss holder comprising a handle, transversely spaced pairs of jaws carried by said handle, a strip of dental floss extending between said jaws, a tooth engageable wheel disposed between said jaws, for limiting downward movement of said jaws and said dental floss, means adjustably mounting said wheel for movement relative to said jaws in a plane passing through said jaws and generally parallel to said jaws.

2. A dental floss holder comprising a handle, transversely spaced pairs of jaws carried by said handle, a tooth engageable wheel disposed between said jaws for limiting downward movement of said jaws, means adjustably mounting said wheel for movement relative to said jaws in a plane passing through said jaws and generally parallel to said jaws, said means including a transverse support bar carried by said jaws, a spindle extending normal to and passing through said support bar, a wheel support on said spindle.

3. A dental floss holder comprising a handle, transversely spaced pairs of jaws carried by said handle, a tooth engageable wheel disposed between said jaws for limiting downward movement of said jaws, means adjustably mounting said wheel for movement relative to said jaws in a plane passing through said jaws and generally parallel to said jaws, said means including a transverse support bar carried by said jaws, a spindle extending normal to and passing through said support bar, a wheel support on said spindle, a transverse axle carried by said wheel support, said axle having end portions guidingly received between jaws of each of said pairs of jaws.

4. A dental floss holder comprising a handle, a threaded fitting on the forward end of said handle, a first pair of spaced parallel arms, a second pair of spaced parallel arms, said first and second pairs of arms being in overlying relation, a transverse connector connecting together rear portions of said first pair of arms, a transverse block connecting together rear portions of said second pair of arms, first jaws depending from forward ends of said first arms, second jaws depending from forward ends of said second arms in cooperating relation with said first jaws, a threaded extension on said transverse connector being threadedly engaged with said threaded fitting, said transverse block being in abutment with said threaded fitting whereby rotation of said handle results in the relative movement of said jaws.

5. A dental floss holder comprising a handle, a threaded fitting on the forward end of said handle, a first pair of spaced parallel arms, a second pair of spaced parallel arms, said first and second pairs of arms being in overlying relation, a transverse connector connecting together rear portions of said first pair of arms, a transverse block connecting together rear portions of said second pair of arms, first jaws depending from forward ends of said first arms, second jaws depending from forward ends of said second arms in cooperating relation with said first jaws, a threaded extension on said transverse connector being threadedly engaged with said threaded fitting, said transverse block being in abutment with said threaded fitting whereby rotation of said handle results in the relative movement of said jaws, a tooth engageable wheel disposed between said jaws for limiting downward movement of said jaws, means adjustably mounting said wheel for vertical movement relative to said jaws.

6. A dental floss holder comprising a handle, a threaded fitting on the forward end of said handle, a first pair of spaced parallel arms, a second pair of spaced parallel arms, said first and second pairs of arms being in overlying relation, a transverse connector connecting together rear portions of said first pair of arms, a transverse block connecting together rear portions of said second pair of arms, first jaws depending from forward ends of said first arms, second jaws depending from forward ends of said second arms in cooperating relation with said first jaws, a threaded extension on said transverse connector being threadedly engaged with said threaded fitting, said transverse block being in abutment with said threaded fitting whereby rotation of said handle results in the relative movement of said jaws, a tooth engageable wheel disposed between said jaws for limiting downward movement of said jaws, means adjustably mounting said wheel for movement relative to said jaws in a plane passing through said jaws and generally parallel to said jaws, said means including a transverse support bar carried by said jaws, a spindle extending normal to and passing through said support bar, a wheel support on said spindle.

7. A dental floss holder comprising a handle, a threaded fitting on the forward end of said handle, a first pair of spaced parallel arms, a second pair of spaced parallel arms, said first and second pairs of arms being in overlying relation, a transverse connector connecting together rear portions of said first pair of arms, a transverse block connecting together rear portions of said second pair of arms, first jaws depending from forward ends of said first arms, second jaws depending from forward ends of said second arms in cooperating relation with said first jaws, a threaded extension on said transverse connector being threadedly engaged with said threaded fitting, said transverse block being in abutment with said threaded fitting whereby rotation of said handle results in the relative movement of said jaws, an adjustable spreader extending between said first and second arms for tensioning a length of dental floss extending between said jaws.

8. A dental floss holder comprising a handle, a threaded fitting on the forward end of said handle, a first pair of spaced parallel arms, a second pair of spaced parallel arms, said first and second pairs of arms being in overlying relation, a transverse connector connecting together rear portions of said first pair of arms, a transverse block connecting together rear portions of said second pair of arms, first jaws depending from forward ends of said first arms, second jaws depending from forward ends of said second arms in cooperating relation with said first jaws, a threaded extension on said transverse connector being threadedly engaged with said threaded fitting, said transverse block being in abutment with said threaded fitting whereby rotation of said handle results in the relative movement of said jaws, said handle being hollow and forming a dental floss receptacle, said handle having a removable rear cap.

References Cited in the file of this patent

UNITED STATES PATENTS

| | | |
|---|---|---|
| 1,180,620 | Stuart | Apr. 25, 1916 |
| 1,279,026 | Sievers | Sept. 17, 1918 |
| 1,623,231 | Bowling et al. | Apr. 5, 1927 |
| 2,146,375 | Landis | Feb. 7, 1939 |
| 2,217,917 | Munro | Oct. 15, 1940 |
| 2,492,291 | Johnson | Dec. 27, 1949 |